United States Patent Office 3,113,245
Patented Dec. 3, 1963

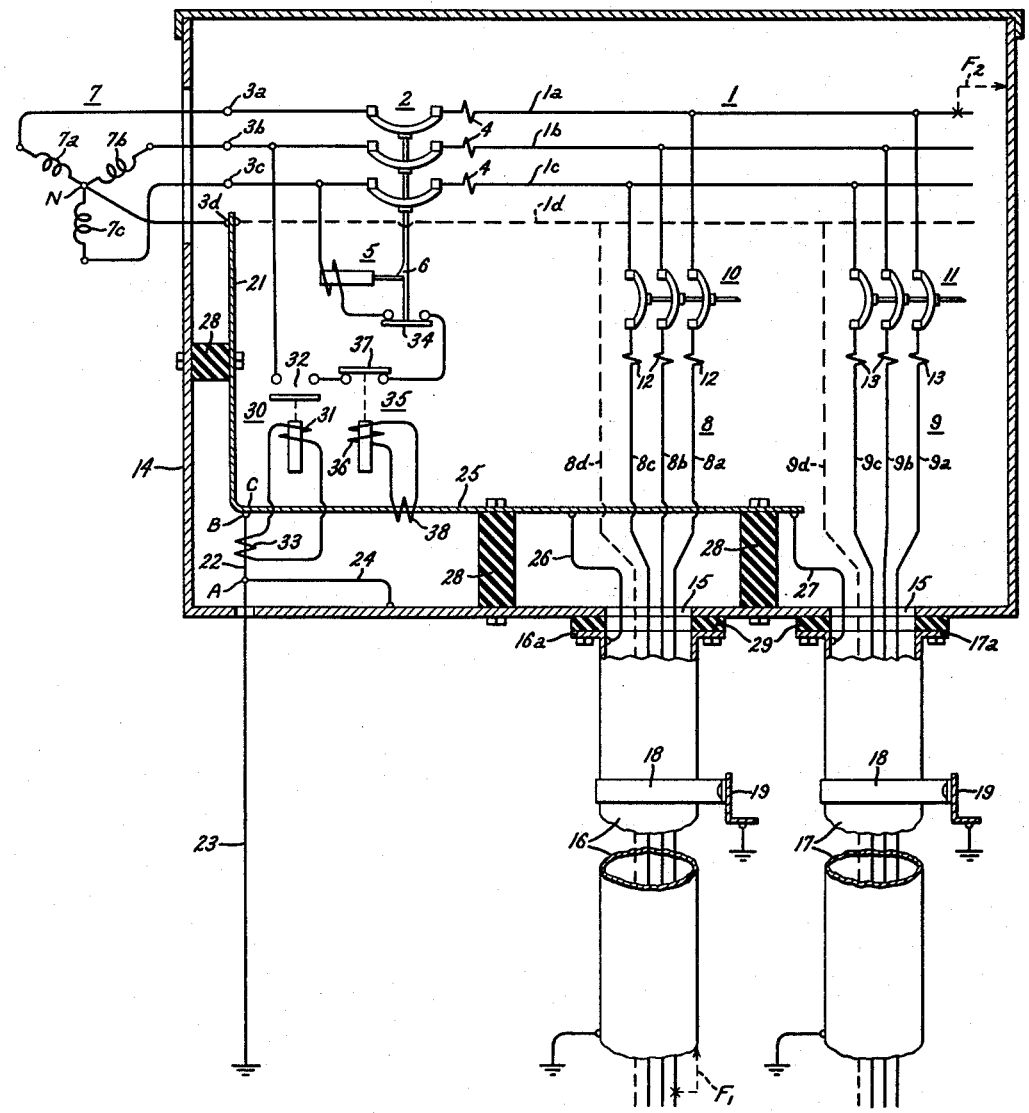

3,113,245
GROUND FAULT RESPONSIVE PROTECTIVE SYSTEM FOR ELECTRIC POWER DISTRIBUTION APPARATUS
Daniel C. Hoffmann, Lansdowne, Pa., assignor to General Electric Company, a corporation of New York
Filed Mar. 12, 1962, Ser. No. 178,949
6 Claims. (Cl. 317—18)

This invention relates to ground fault responsive protective systems for electric power distribution apparatus, and more particularly it relates to a ground fault protective system for metal-enclosed electric apparatus supplying distribution circuits which are sheathed in grounded metal conduits.

In the art of electric power distribution, it is customary to dispose a plurality of interconnected circuit controlling devices and other associated circuit components inside a grounded sheet-metal housing. This apparatus, generally known as "switchgear," provides in one integral "package" or station the requisite means for safely and reliably controlling and protecting many different feeders or utilization circuits which are supplied from a common source of electric power.

In low voltage (e.g., 600 volts A.-C.) distribution apparatus of the kind often used in industrial power systems and in large commercial or institutional buildings, it is common practice to confine the respective feeder circuits which emanate from the housing in grounded metal conduits. By "conduit" I mean any metallic sheath or covering for electric current conductors, including for example, bus duct, busway, raceway, and armored cable. My invention is intended to provide fault protection for apparatus having such conduits associated therewith.

Conventional fault protective schemes for electric power distribution systems include appropriate equipment for quickly sensing and individually isolating any short circuit occurring in the respective feeder circuits. For complete fault protection, however, additional means must be provided to disconnect the entire apparatus from its source of power in the event a fault condition develops somewhere within the above-mentioned housing. This latter region or section of protection will be referred to hereinafter as "internal," in contrast to those external regions, located outside the housing, along the feeders or at the ultimate electric loads connected thereto. My invention is designed to discriminate between internal and external faults and to provide selective protection against internal faults only.

The protective system which is claimed herein has been disclosed in a copending patent application to Howard D. Kurt, Serial No. 178,947, filed March 12, 1962, assigned to the assignee of the present application. As is pointed out in that application, the problem of obtaining selective yet sensitive and high-speed response to internal faults which involve ground has been a particularly troublesome one in the art. While a "differential" form of relaying is able to provide satisfactory protection, it is unattractively expensive and relatively difficult to apply. In the copending application there is claimed a less expensive and easier to apply ground fault protective system for electric power distribution apparatus, and it will briefly be summarized in the following paragraph.

In accordance with the teachings contained in the aforesaid copending patent application of Howard D. Kurt, distribution apparatus which is housed in a grounded metal structure and which is arranged for energization from a source of electric power having one terminal adapted for grounding, said apparatus including means for controlling and protecting a plurality of feeder circuits emanating from the structure in grounded metal conduits, may selectively be protected against internal ground faults by providing: (1) insulating means for preventing electric contact between the conduits and said one terminal of the source except by way of an isolated conduit return conductor, (2) a separate conducting path for connecting said one terminal to the station ground and to the enclosing structure, and (3) an electroresponsive device for effecting a predetermined protective function in substantially instantaneous response to current in the separate conducting path attaining a predetermined magnitude. The electroresponsive device does not operate for external faults because of the division of ground current between the parallel return paths provided, respectively, by the conduit itself and by the station ground. The maximum amount of current flowing in the aforesaid separate conducting path upon the occurrence of an external ground fault is less than the predetermined magnitude of current to which the device functionally responds, yet said predetermined magnitude is less than the minimum amount of current expected in that path under internal ground fault conditions.

A general object of my invention is the provision, for selectively responding to internal ground faults, in electric power distribution apparatus, of an improved protective system which is inexpensive to manufacture, easy to apply and even more sensitive than the protective system claimed in the copending Kurt application.

Another object of the present invention is the provision, for distribution equipment having grounded metal conduits associated therewith, of an inexpensive, sensitive internal ground fault responsive protective system the operation of which is definitely blocked for an external ground fault condition.

It is a further object of my invention to provide an improved protective system for effecting a protective function in high-speed response to only internal ground faults in power distribution apparatus regardless of the physical arrangement of the station ground.

In carrying out my invention in one form, I provide a protective system which is responsive to internal ground faults in a grounded metal structure housing distribution apparatus arranged for energization from a source of electric power which has one terminal adapted for grounding. The apparatus being protected includes means for controlling and protecting a plurality of feeder circuits which emanate from the structure in grounded metal conduits. Electric contact between the conduits and said one terminal of the source is generally prevented by insulating means, except that an isolated conduit return conductor is provided for this specific purpose. A separate conducting path is provided for connecting said one terminal to the station ground and to the enclosing structure, and a first electroresponsive device is coupled to this path for effecting a predetermined protective function when ground current flows therein. I provide a second electroresponsive device which is coupled to the aforesaid isolated conduit return conductor, and when the second device operates in response to the occurrence of any external ground fault, it renders the first device ineffective. With this arrangement the protective function can be effected only if the ground current energizing the first device is due to an internal fault condition.

My invention will be better understood and its various objects and advantages will be more fully appreciated from the following description taken in conjunction with the accompanying drawing the single FIGURE of which is a schematic representation of electric power distribution apparatus protected against internal ground faults by a preferred embodiment of my invention.

Referring now to the drawing, the illustrated apparatus will be seen to comprise an electric power bus 1 having three separate phase conductors 1a, 1b and 1c. Main switching means, comprising a 3-pole circuit interrupter 2, is provided to connect the three phase conductors 1a, 1b and 1c to a polyphase source of electric power represented by terminals 3a, 3b and 3c. The circuit interrupter 2 is equipped with phase overload trip elements identified by the reference numeral 4, and it is further equipped with a shunt trip device 5 which operates, when energized, to release a latch 6 thereby enabling an opening spring (not shown) to effect high-speed opening of its switch contacts.

In the illustrated embodiment of my invention, the main circuit interrupter 2 is adapted to be connected to a 3-phase low voltage A.-C. source of electricity comprising star-connected secondary windings 7a, 7b and 7c of a power transformer 7. The primary of the transformer 7 has not been shown. The three secondary windings 7a, 7b and 7c are respectively connected to terminals 3a, 3b and 3c, and the transformer neutral N is connected to another terminal 3d as shown. Terminal 3d is adapted for grounding, and hence the entire low voltage power system is grounded. In 4-wire distribution systems, an insulated neutral bus 1d would be connected to terminal 3d, but since this is optional, a broken-line showing of the neutral bus has been employed in the drawing. Those skilled in the art will understand that the illustrated distribution apparatus could alternatively be energized by electric power sources other than the particular arrangement shown. For example, the transformer secondary windings might be connected in delta, with a mid-tap of one of the windings being adapted to be grounded.

The electric power bus 1 is tapped by two parallel, multiwire feeders 8 and 9. The feeder 8 comprises three phase conductors 8a, 8b and 8c (and a neutral conductor 8d if desired), with these phase conductors being connected to the respective phase conductors of the main bus by means of a 3-pole circuit controlling device 10. The feeder 9 also comprises three phase conductors 9a, 9b and 9c (and a neutral conductor 9d if desired), with these phase conductors being connected to the respective phase conductors of the main bus by means of a 3-pole circuit controlling device 11. The illustrated circuit-controlling devices 10 and 11 are shown as circuit interrupters which may be opened and closed (by mechanisms not shown) to individually control the energization of the respective feeder circuits 8 and 9. For protection purposes these interrupters are also equipped with conventional phase overload trip elements, identified by the reference numerals 12 and 13, respectively.

The main bus 1 and the three circuit interrupters 2, 10 and 11 are all physically housed in a grounded metal structure 14. The feeders 8 and 9 emanate from this enclosing structure or housing through appropriate openings 15 as shown. Outside housing 14 the feeder circuits 8 and 9 are embraced by grounded metal conduits 16 and 17, respectively, and so covered these circuits extend for relatively long distances to remotely located loads or other distribution assemblies (not shown). The conduit associated with each feeder circuit may be supported at lengthwise intervals by suitable straps 18 anchored to structural angles 19. The particular arrangement illustrated in the drawing is intended to be representative of many different kinds of metal conduits which might emanate from any surface of the housing 14 and run in various directions to their ultimate destinations.

The two conduits 16 and 17, the housing 14 and the neutral terminal 3d of the power source are all connected electrically to the symbolically illustrated station ground. The station ground may actually be a cold water pipe, building steel or the like. The connection from the neutral terminal 3d to station ground is provided by first circuit means comprising conductive members 21, 22 and 23 in series. Second circuit means, comprising the usual equipment ground bus 24, interconnects the housing 14 and a segment A of the first circuit means. An isolated conduit return conductor 25 is connected to another segment B of the first circuit means, with segment B being located on the terminal-3d side of segment A as can be seen in the drawing.

The conduits 16 and 17 are connected to the conductor 25 by means of conductive members 26 and 27, respectively. The conductor 25 and the conductive member 21, which may be parts of a continuous copper bar as shown, form conducting means adapted electrically to interconnect both conduits and the neutral N of the power source, independently of the switching means 2. This conducting means is affixed to insulating supports 28, and therefore it is electrically insulated from the housing 14. However, it is, of course, in contact with the housing by way of conducting means comprising the conductive member 22 and the switchgear ground bus 24 which are connected between the housing 14 and part C of the first-mentioned conducting means.

While the enclosing structure or housing 14 is adapted physically to terminate the conduits 16 and 17, an electrically insulated relationship is here maintained by means of insulating gaskets 29 or the like which are disposed between the housing and the conduit flanges 16a and 17a. Thus it is apparent that electric contact between the conduits and the housing is prevented, except through a path including the isolated conductor 25 and the conductive member 22.

When a remote external ground fault occurs in the illustrated power system (such as at $F_1$ in the drawing), the fault current which flows to the faulted point via a phase conductor (8a) of the feeder circuit will ordinarily, in returning to the grounded terminal 3d of the source, prefer to follow a path through the metal conduit (16) rather than returning by way of station ground. This is because the conduit is disposed in much closer proximity to the phase conductor, and the inductance of these intimately parallel paths is substantially less than the inductance of the illustrated loop formed by the faulted phase conductor and station ground. Consequently, upon the occurrence of the external ground fault ($F_1$), more ground current flows in the circuit (26, 25, 21) which connects the affected conduit (16) to the grounded terminal 3d than will flow in the circuit (23, 22, 21) connecting the station ground to terminal 3d. This division of fault current has been confirmed by actual tests which revealed that less than 30 percent of the total ground current for an external ground fault returns through the station ground.

In accordance with the copending Kurt application referred to hereinbefore, internal ground fault protection of the illustrated distribution apparatus is obtained by arranging the main circuit interrupter 2 to be opened, thereby deenergizing the entire power bus 1 and all its associated feeder circuits, by the operation of electroresponsive means 30 coupled to the conductive member 22 which carries ground current between segments A and B of the grounding circuit for terminal 3d. While the electroresponsive means 30 has been shown as an electromagnetic relay having an operating winding 31 and a normally open contact 32, it could take other forms: it could for example be an equivalent "static" circuit arrangement, or a direct acting current responsive trip element of the circuit interrupter 2. As illustrated the device is inductively connected to the member 22 by means of a current transformer 33, and when energized by current of sufficient magnitude, its operating winding 31 effects substantially instantaneous closure of the contact 32. The contact 32, in series circuit relationship with the shunt trip device 5 and a normally open auxiliary contact 34 of the circuit interrupter 2, is connected across terminals 3b and 3c of the electric power source, whereby circuit opening operation of the main circuit interrupter can be initiated upon operation of relay 30.

By selecting a relay 30 which will not effect its protective function until current in the member 22 attains a predetermined magnitude which is somewhat higher than the relatively small portion of the maximum total external ground fault current expected therein, on relay operation will take place when an external ground fault occurs along a feeder or at a load. However, the relay faithfully and quickly operates in response to any internal ground fault within the housing 14 (such as at $F_2$ in the drawing) which results in ground current greater than said predetermined magnitude flowing through the conductive member 22 between the housing 14 and terminal 3d. Thus the desired selectivity and sensitivity can both be obtained by using the single electroresponsive device 30 as shown. In some special circumstances, however, the amount of ground current flowing in the member 22 due to an internal fault might possibly not exceed the expected maximum external ground fault current which can flow therein, and either sensitivity or selectivity would be compromised if the relay 30 alone were used under such circumstances.

In accordance with my invention, an increased sensitivity of response to all possible internal ground fault occurrences is obtained without losing selectivity by utilizing additional electroresponsive means 35, as is shown in the drawing. This electroresponsive means 35, which preferably comprises another electromagnetic relay having an operating winding 26 and a normally closed contact 37 serially connected to contact 32 of the relay 30, is coupled to the isolated conduit return conductor 25 between part C thereof and the conduits by means of a current transformer 38. When energized the relay 35 will open its contact 37 to prevent completion of the energizing circuit of the shunt trip device 5, and as a result the opening operation of the main circuit interrupter 2 is blocked. This arrangement enables the relay 30 to be set at an unusually low pickup level without risking false operation of the protective system in response to external ground faults. The blocking relay 35, being energized in accordance wtih ground current flowing between the grounded terminal 3d and the conduits 16 and 17, picks up in response to all ground faults in any conduit, and consequently the relay 30 will be rendered ineffective to perform its intended protective function whenever an external ground fault occurs.

The "pickup" level of the electromagnetic relay 35 should be set at a sufficiently low current magnitude so that proper coordination with relay 30 for external ground faults is ensured. It is essential, of course, that the contact 37 open before contact 32 can close under all blocking conditions.

One of the benefits of my protective system is that its selective operation is independent of the physical arrangement of the station ground or the location of the external ground fault. Operation of my system will be definitely blocked by the relay 35 even if an external fault located near the beginning of the conduit should happen to result in a greater magnitude of ground current flowing through member 22 than through the conduit return conductor 25.

While a preferred form of my invention has been shown and described by way of illustration, many modifications will occur to those skilled in the art. I therefore contemplate by the claims which conclude this specification to cover all such modifications as fall within the true spirit and scope of my invention.

What I claim as new and desire to secure by United States Letters Patent is:

1. A ground fault protective system for A.-C. electric power apparatus comprising:
   (a) a first multipole circuit interrupter adatped to be connected to a polyphase source of electric power, said source having a neutral terminal;
   (b) a plurality of additional multipole circuit interrupters connected to said first circuit interrupter;
   (c) a grounded metal structure for housing all of said circuit interrupters and their interconnections;
   (d) a plurality of multiwire feeder circuits emanating from said structure and connected therein to said additional circuit interrupters, respectively;
   (e) grounded metal conduit means respectively embracing said feeder circuits outside said structure;
   (f) first conducting means adapted to be connected between said conduit means and the neutral terminal of said source, said first conducting means being electrically insulated from said structure;
   (g) second conducting means connected between said structure and a predetermined part of said first conducting means;
   (h) first electroresponsive means coupled to said second conducting means for initiating circuit interrupting operation of said first circuit interrupter in response to current in the second conducting means attaining at least a predetermined magnitude, and
   (i) second electroresponsive means coupled to said first conducting means for energization in accordance with the current flowing between said conduit means and said predetermined part of the first conducting means, the second electroresponsive means being effective when energized to block circuit interrupting operation of said first circuit interrupter.

2. A ground fault protective system for electric distribution equipment comprising:
   (a) an electric power bus;
   (b) switching means for connecting a source of electricity to said bus;
   (c) at least one circuit controlling device for connecting at least one feeder circuit to said bus;
   (d) a grounded metal structure for housing said bus, said switching means and said circuit controlling device,
   (e) said structure being adapted physically to terminate, in electrically insulated relationship therewith, at least one grounded metal conduit associated with a feeder circuit controlled by said circuit controlling device;
   (f) first conducting means adapted electrically to interconnect said conduit and said source independently of said switching means, said first conducting means being supported by said structure in electrically insulated relationship therewith;
   (g) second conducting means for interconnecting said structure and a predetermined part of said first conducting means;
   (h) first electroresponsive means coupled to said second conducting means to initiate opening of said switching means whenever current flowing in the second conducting means attains a predetermined magnitude; and
   (i) second electroresponsive means coupled to said first conducting means between said predetermined part thereof and said conduit to prevent opening of said switching means by said first electroresponsive means whenever current flowing in said first conducting means attains another predetermined magnitude.

3. A ground fault protective system for electric distribution apparatus located in a grounded metal housing, the apparatus being arranged for energization from a source of electric power having a predetermined terminal adapted for grounding and being equipped to control and protect a polarity of feeder circuits which emanate from the housing in grounded metal conduits, the combination comprising:
   (a) first circuit means adapted to be connected between said housing and a predetermined terminal of said source;
   (b) second circuit means adapted to be connected between said conduits and said predetermined terminal;
   (c) means for preventing electric contact between said housing and said conduits except through a path including said first and second circuit means;
   (d) a first electroresponsive device for effecting a predetermined protective function in response to energization by current of greater than a predetermined magnitude;
(e) first means connecting said first electroresponsive device for energization by current flowing between said housing and said predetermined terminal in said first circuit means;
(f) a second electroresponsive device operative when energized to render said first device ineffective; and
(g) second means connecting said second electroresponsive device for energization by current flowing between said predetermined terminal and said conduits in said second circuit means.

4. In a ground fault protective system for electric distribution apparatus located in a grounded metal housing, the apparatus being arranged for energization from a polyphase source of power having a predetermined terminal adapted to be grounded and being equipped to control and protect a plurality of feeder circuits which emanate from the housing in grounded metal conduits, the combination comprising:
(a) first circuit means for connecting the predetermined terminal of said source to ground;
(b) second circuit means for connecting said housing to a first segment of said first circuit means;
(c) third circuit means for connecting said conduits to a second segment of said first circuit means located between said first segment and said predetermined terminal;
(d) means for preventing electric contact between said housing and said conduits except through a path including said first and third circuit means;
(e) a first electroresponsive device for effecting a predetermined protective function in response to energization by current of greater than a predetermined magnitude;
(f) first means connecting said first electroresponsive device for energization by current flowing in said first circuit means between said first and second segments thereof;
(g) a second electroresponsive device operative when energized to render said first device ineffective; and
(h) second means connecting said second electroresponsive device for energization by current flowing in said third circuit means.

5. A ground fault protective system for electric power distribution apparatus located in a grounded metal housing, the apparatus being arranged for energization from a polyphase source of power having a neutral terminal and being equipped to control and protect at least one feeder circuit which emanates from the housing in a grounded metal conduit, the combination comprising:
(a) first conducting means adapted to interconnect said conduit and the neutral terminal of said source;
(b) second conducting means adapted to interconnect said housing and a predetermined part of said first conducting means;
(c) insulating means for preventing electric contact between said conduit and said housing except through a path provided by said first and second conducting means;
(d) a first electroresponsive device coupled to said second conducting means for effecting a predetermined protective function in response to current in the second conducting means attaining a predetermined magnitude; and
(e) a second electroresponsive device coupled to said first conducting means between said predetermined part thereof and said conduit for rendering said first device ineffective in response to the flow of current between said conduit and said neutral terminal.

6. A ground fault protective system for electric power distribution apparatus comprising:
(a) a first circuit interrupter adapted to be connected to a source of electric power having a predetermined terminal adapted for grounding, said interrupter being equipped with a shunt trip device for effecting, when energized, a circuit opening operation of the interrupter;
(b) a plurality of additional circuit interrupters adapted to be connected, respectively, to a plurality of feeder circuits;
(c) means interconnecting said first interrupter and said additional interrupters;
(d) a grounded metal structure for housing all of said interrupters and said interconnecting means, said structure being adapted physically to terminate, in electrically insulated relationship therewith, a plurality of grounded metal conduits which embrace, respectively, the feeder circuits outside the structure;
(e) first conducting means adapted electrically to connect the predetermined terminal of said source to the conduits, said first conducting means being supported by said structure in electrically insulated relationship therewith;
(f) second conducting means adapted electrically to connect a predetermined part of said first conducting means to ground;
(g) a first current responsive electromagnetic relay inductively coupled to said second conducting means and operable whenever current flowing in the second conducting means attains a predetermined magnitude to connect said shunt trip device to the source of electric power for energization thereby; and
(h) a second current responsive electromagnetic relay inductively coupled to said first conducting means between said predetermined part thereof and the conduits, said second relay being effective when operatively energized to prevent said connection of the shunt trip device to the source of electric power by said first relay.

References Cited in the file of this patent
UNITED STATES PATENTS

| 2,929,963 | Kaestle | Mar. 22, 1960 |
| 3,005,932 | Soares | Oct. 24, 1961 |